March 11, 1969 V. H. BALDING 3,431,634
MACHINE TOOLS

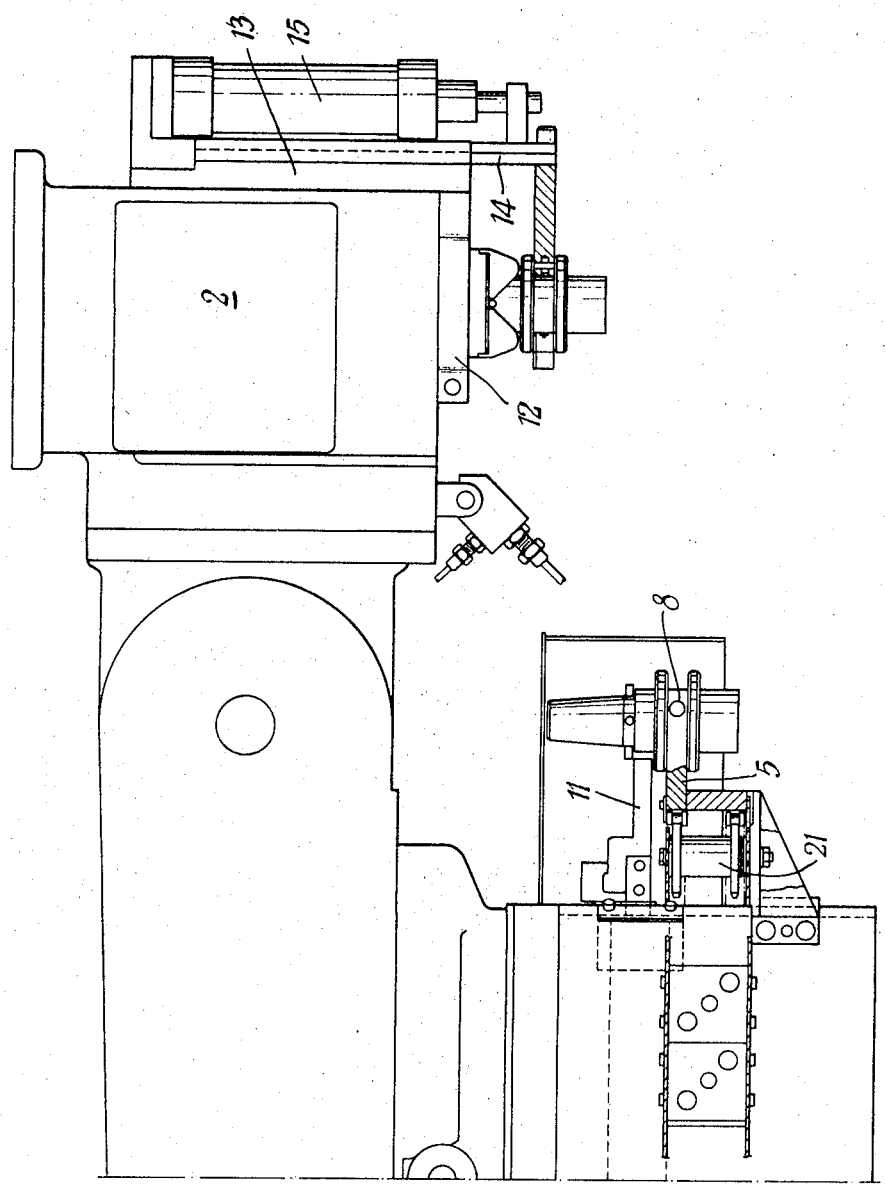

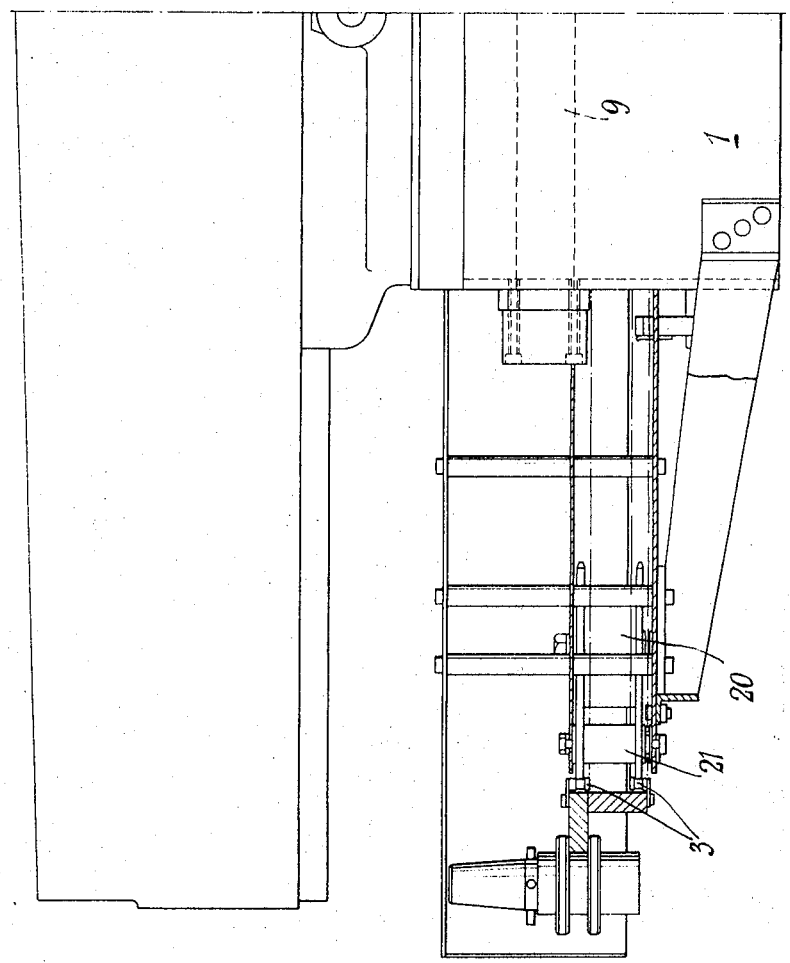

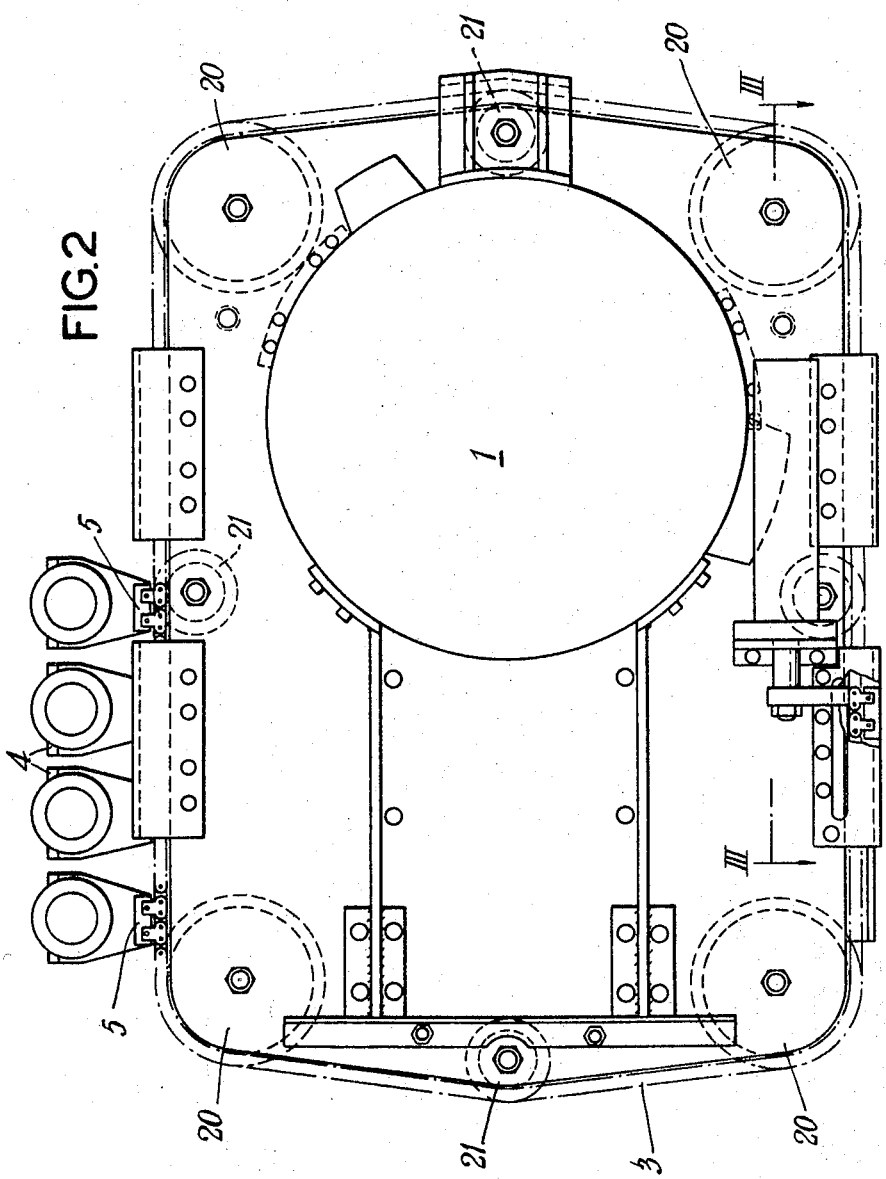

Filed Jan. 16, 1967

INVENTOR
VICTOR H. BALDING

United States Patent Office 3,431,634
Patented Mar. 11, 1969

3,431,634
MACHINE TOOLS
Victor Horace Balding, Beavers Woods, Ringland Road,
Taverham, Norwich, Norfolk, England
Filed Jan. 16, 1967, Ser. No. 609,583
Claims priority, application Great Britain, Jan. 17, 1966,
2,043/66, 2,044/66
U.S. Cl. 29—568  10 Claims
Int. Cl. B23q 3/155

ABSTRACT OF THE DISCLOSURE

A machine tool having rotary tools of various size or function carried in a closed path about a vertical support column of the machine and hydraulically operated rams for transferring selected tools through horizontal and vertical paths to and from the machine work head.

---

This invention concerns improvements in machine tools and is directed to the provision of vertical milling and/or drilling machines operated by means of a tape or like programmed operation or by push-button operation by the operator. This is an important feature of this invention in that it can be used with its own method of control i.e. push-button, or can be linked with tape or other controls.

The adoption of automated operation of milling and/or drilling machines calls for automatic tool changing at the head of the machine in accordance with any desired sequence, and it is an object of the present invention to provide machines having improved means for such automatic tool changing.

According to the invention I provide a vertical milling and/or drilling machine having a number of tools arranged to be driven in a closed path around the machine column below the machine head, means for stopping the drive when selected tool is positioned between the said column and the machine head, a ram to transfer the selected tool to or from a position directly below the quill of the head and a ram for shifting the tool vertically into or out of engagement with the said quill.

The expression "machine column" as used in this context is intended to include any raising block incorporated in such column.

According to the invention from another aspect I provide a vertical milling and/or drilling machine having means for selectively positioning any one of a number of tools between the machine column and the machine head in a plane below that head, a ram passing through the machine column to transfer a selected tool to or from a position directly beneath the quill of the head and means for shifting the selected tool vertically into or out of engagement with the said quill.

It will be appreciated that by arranging the tools in a closed path around the machine column, rather than in a straight line or in a closed path alongside the column, an important saving of space is achieved.

The preferred shape of the closed path can be circular, oval or rectangular with large corner radii and may conveniently be concentric with the column, but larger paths may be eccentric with respect to the column.

The path may be defined by the positioning of various sprockets carrying chains to which are attached a number of tool holders.

Drive to the chain is preferably derived from a hydraulic ram through a ratchet acting on the chain.

It will further be appreciated that housing the ram which transfers selected tools horizontally, within the machine column results in an important saving of space. Also withdrawal of the horizontal ram after positioning of the tool enables the machine head to be shifted universally for the carrying out of work in various planes.

It is an important feature that all movements are derived from hydraulic rams. All hydraulic rams can be operated electronically by means of a series of rotating cams actuating micro-switches coupled in series with a bank of solenoid operated hydraulic valves.

Other features of the invention include the use of spring retaining tool holders which carry the tools not in use, and a slide mounted hydraulic cylinder mounted on the front of the machine quill for vertical movement of the tools. The fact that the slide arrangement is clamped to the machine quill permits any desirable vertical movement of that quill.

The above and other features of the invention are incorporated in a preferred form of machine tool, which will now be described in some detail with reference to the accompanying drawings in which:

FIGS. 1A and 1 jointly constitute a side elevation in part section of the upper part of a milling and/or drilling machine incorporating principles of the invention.

FIG. 2 is an underneath plan of the machine of FIG. 1, omitting the work head.

Figure 3:
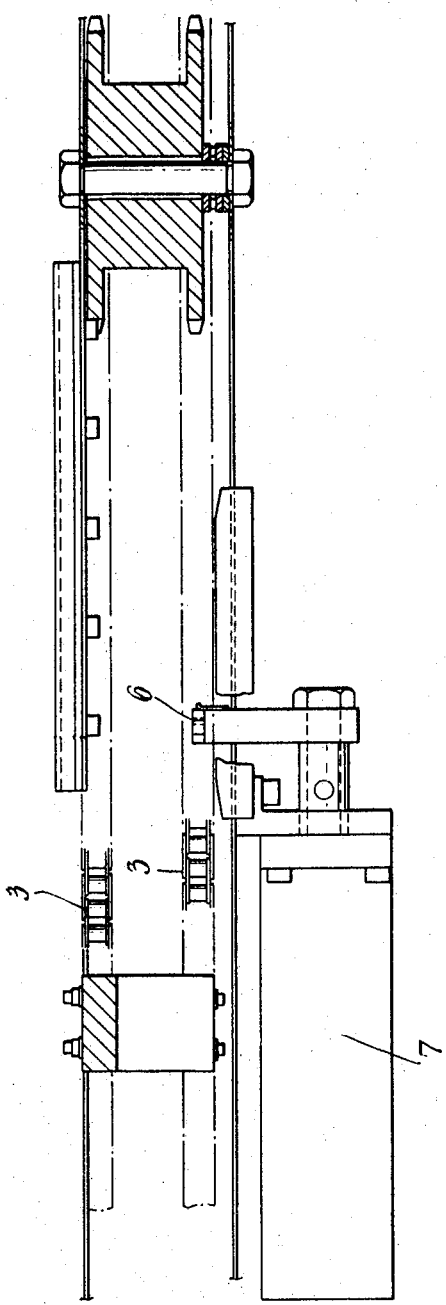
FIG. 3 is a side elevation on the line III—III of FIG. 2 showing indexing mechanism for tool holders of the machine.
Figure 4:
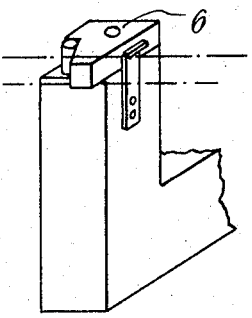
FIG. 4 is a detail perspective view of an item of the mechanism of FIG. 3.

The machine is a vertical milling and/or drilling machine having a main support column 1 carrying a universally adjustable work head 2 which incorporates a driving guide (not shown), and slides for a work table which is shiftable in three transverse planes (not shown).

A duplex chain 3 is mounted horizontally on sprockets 20 and 21 around the raising block of the support column beneath the work head support and this chain carries the tool holders 4 supported at various points by short brackets 5.

The tool-carrying chain is driven by a ratchet pawl 6 connected to the hydraulic ram 7. As the ram extends, the tool-carrying chain 3 is driven around its defined path and on the return stroke of the ram the pawl slips over the chain links. The ram is restrained from rotation.

The brackets 5 screwed to the periphery of the chain at regularly spaced intervals carry fork type tool-holders which are fitted with ball catches 8 to support special cutter arbors.

The tool-carrying chains may be supplied in various lengths to incorporate various numbers of tools. The smallest chain length may be concentric with the raising head and carry, say, fifteen different tools, while larger eccentrically mounted chains may carry larger numbers. Such larger chains pass through a point common to the path of the concentric chains lying beneath the major axis of the work head, so that tools carried by any size of chain may be halted in an identical position.

Figure 5:
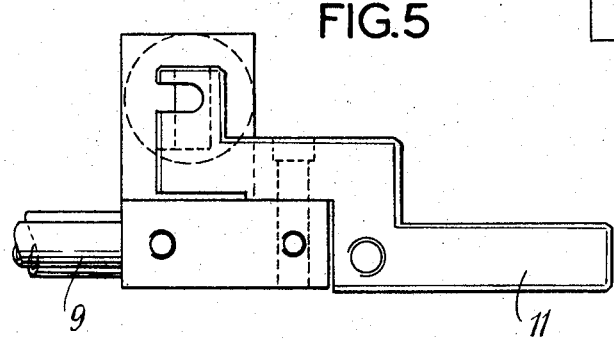
FIG. 5 is a detail elevation of a tool transferring clamp indicated in FIG. 1.
Figure 6:
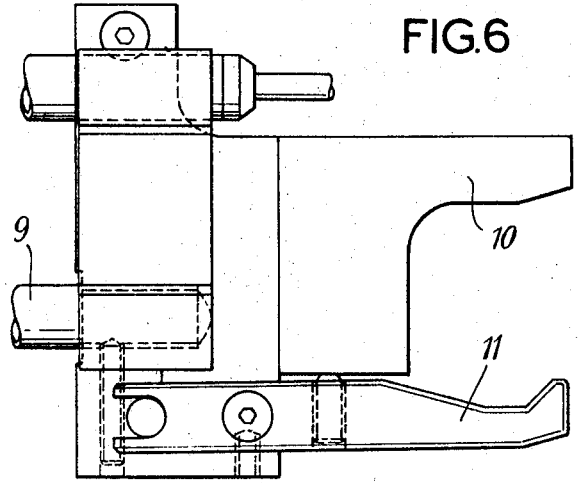
FIG. 6 is a plan of the clamp shown in FIG. 5.

A variable stroke ram 9 passing through the raising block and aligned with the major axis of the work head carries a hydraulic mechanical finger apparatus. This finger apparatus, shown in detail in FIGS. 5 and 6 comprises a fixed arm 10 and a hydraulically operated finger 11, it is adapted to pick up the special arbour of any tool from its retaining bracket 5 at the point where it is halted for transfer to a location beneath the machine head quill 12 (FIG. 1) and to carry out such transfer upon a forward stroke.

Vertical slides 13 and 14 attached to the quill by means of brackets are operated by a hydraulic cylinder 15 and carry fingers which engage the selected tool arbour beneath the fingers 10 and 11 on the ram 9, and being clamped in this position release the ram fingers. The ram performs a reverse stroke to its initial position, while the slides carry the arbour of the selected tool upwards into engagement with the quill.

On completion of a predetermined duty or duties by the tool the slides 13, 14 and ram 9 are operated to disengage the tool from the quill and return it to the tool holder on the chain.

The chain is traversed through the requisite distance to bring a fresh tool into transfer position and the rams and slides are again operated to fix the fresh tool in the quill.

One impulse from the automatic programmer, or the contacting of one switch by push-button means, starts the rotation of the cams to actuate the switches to control all movements of the machine. If an automatic programmer is used in conjunction with the machine, all movements of the machine will be fully automatic, i.e. table movement, knee movement changing of spindle speeds and tool changing.

"Automatic programmer" covers the control of the tool changer from the main machine function controller or from a separate controller for the tool changer only. In this context it could be under manual, tape or any other form of control.

It will be understood that the invention is not restricted to the details of the above described embodiment but includes variants in form and mode of operation within its scope.

It is also understood that this invention is not restricted in its use as an attachment to the milling and/or drilling machine particularly described above, in that it can be adapted for use on other types of machine.

I claim:

1. A vertical machine tool of the kind employing rotary tools and including a machine column and a working head having a quill wherein the tools are arranged to be driven in a closed horizontal path around the machine column to halt a selected tool at a position between said column and said head, a ram to transfer a selected tool to and from a position directly below the quill and a ram for shifting the tool vertically into and out of engagement with the quill.

2. A vertical machine tool of the kind employing rotary tools and including a machine head and a working head having a quill, means for selectively positioning any one of a number of tools between the machine column and the machine head in a plane below that head, a ram passing through the machine column to transfer a selected tool to or from a position directly beneath the quill of the head and means for shifting the selected tool vertically into or out of engagement with the said quill.

3. A vertical machine tool according to claim 1 in which the tools are carried in holders attached to a chain whose path is determined by the positioning of sprocket wheels.

4. A vertical machine tool according to claim 1 in which the tools are carried in holders attached to a chain and the chain is driven by a ratchet pawl operated by a hydraulic ram.

5. A vertical machine tool according to claim 1 wherein the ram for shifting the tool vertically operates slides clamped to the quill.

6. A vertical machine tool according to claim 1 in which holders for the tools include spring retention means.

7. A vertical machine tool according to claim 2 in which the tools are carried in holders attached to a chain whose path is determined by the positioning of sprocket wheels.

8. A vertical machine tool according to claim 2 in which the tools are carried in holders attached to a chain and the chain is driven by a ratchet pawl operated by a hydraulic ram.

9. A vertical machine tool according to claim 2 wherein the ram for shifting the tool vertically operates slides clamped to the quill.

10. A vertical machine tool according to claim 2 in which holders for the tools include spring retention means.

References Cited

UNITED STATES PATENTS

| | | | |
|---|---|---|---|
| 3,238,615 | 3/1966 | Leone | 29—568 |
| 3,277,568 | 10/1966 | Wetzel | 29—568 |
| 3,300,856 | 1/1967 | Daugherty | 29—568 |
| 3,311,973 | 4/1967 | Anthony | 29—568 |
| 3,332,142 | 7/1967 | Lehmkuhl | 29—568 |
| 3,344,511 | 10/1967 | Hosea | 29—568 |

RICHARD H. EANES, JR., *Primary Examiner.*